United States Patent [19]

Knox

[11] Patent Number: 4,579,350

[45] Date of Patent: Apr. 1, 1986

[54] PACKLESS STUFFING BOX FOR POLISH RODS

[76] Inventor: Gary W. Knox, P.O. Box 124, Langley, Okla. 74350

[21] Appl. No.: 661,911

[22] Filed: Oct. 17, 1984

[51] Int. Cl.[4] .......................... F16J 15/18; F16J 15/44; F16J 15/48

[52] U.S. Cl. ........................................ 277/15; 277/22; 277/24; 277/29; 277/59; 277/72 R

[58] Field of Search ....................... 277/15, 22, 24, 27, 277/29, 59, 71, 72 R, 72 FM, 73, 74, 79

[56] References Cited

U.S. PATENT DOCUMENTS

| 2,824,759 | 2/1958 | Tracy | 277/15 |
|---|---|---|---|
| 2,965,398 | 12/1960 | Keller et al. | 277/15 X |
| 3,216,651 | 11/1965 | King et al. | 277/59 X |
| 4,055,107 | 10/1977 | Bartley | 277/24 X |
| 4,106,779 | 8/1978 | Zabcik | 277/59 X |
| 4,136,886 | 1/1979 | Sjoholm et al. | 277/72 R X |
| 4,431,199 | 2/1984 | Iwane | 277/29 X |
| 4,466,619 | 8/1984 | Adams | 277/22 X |

Primary Examiner—Robert S. Ward
Attorney, Agent, or Firm—Head, Johnson & Stevenson

[57] ABSTRACT

A stuffing box for the reciprocal polish rod of a producing oil and/or gas well bore, the rotatable rod of a pump, or the like and comprising a housing disposed around the outer periphery of the rod and concentrically arranged with respect thereto to provide a cooling chamber around the outer periphery of the rod, upper and lower bushing members disposed in the housing and around the outer periphery of the rod for assuring an efficient axial alignment between the rod and the housing during reciprocation of the rod, annular sealing members interposed between the bushings and the rod for precluding leakage of fluid therebetween with the use of the usual packing assemblies, a charging seal provided at the lowermost bushing and responsive to pressure differentials acting thereacross for admitting fluid into the cooling chamber while precluding movement of fluid from the cooling chamber around the charging seal, a valved internal passageway provided in the stuffing box providing communication between the cooling chamber and a fluid reservoir for automatically controlling circulation of the fluid to and from the cooling chamber as required during operation of the stuffing box and rod, and one embodiment of the stuffing box including a fluid seal for isolating the cooling chamber from any fluid which may be present in the fluid reservoir.

13 Claims, 2 Drawing Figures

PACKLESS STUFFING BOX FOR POLISH RODS

CROSS-REFERENCE TO RELATED APPLICATIONS

This application is related to my co-pending application Ser. No. 661,666, filed on Oct. 17, 1984 and entitled "Self-Aligning Lubricating Stuffing Box."

BACKGROUND OF THE INVENTION

1. Field of the Invention

This invention relates to improvements in stuffing boxes and more particularly, but not by way of limitation, to a self-aligning, self-lubricating packless stuffing box for polish rods of producing oil and/or gas well bores, rotatable pump rods, or the like.

2. Description of the Prior Art

Many producing oil and/or gas well bores are provided with down-hole pumping apparatus operable for elevating the well fluids to the surface of the ground. The usual down-hole pumping apparatus is actuated by a surface mounted pump jack assembly which is connected with the down-hole pump by a polish rod or sucker rod string which extends longitudinally through the well bore into connection with the pump means. The reciprocation of the sucker rod string or polish rod by the pump jack actuates the downhole pump for elevating the well fluids through the well tubing for delivery through the usual pumping "T" for recovery of the fluids. It is common practice to install a stuffing box around the outer periphery of the polish rod above the pumping "T" for precluding the loss of the well fluids around the outer periphery of the polish rod. The stuffing box is normally provided with a plurality of packing members engagable with the outer periphery of the rod and the inner periphery of the housing to achieve the sealing of the polish rod. As the polish rod reciprocates with respect to the stuffing box, considerable friction may develop between the packing members and the rod, causing wear and damage to the packing member, thus reducing the sealing efficiency thereon. It is common practice to provide packing followers in the stuffing box for adjusting the pressure of the packing members against the rod to compensate for the wear of the packings. In addition, it is desirable to provide an efficient lubrication between the polish rod and the packings for reducing the wear of the packing during the operation of the rod.

The Reeves Pat. No. 3,468,374, issued Sept. 23, 1969, and entitled "Self-Cooled Oil Well Polish Rod Stuffing Box" has been devised to reduce or overcome the problem caused by frictional heat or inadequate lubrication of the stuffing box. The Reeves stuffing box includes a cooling chamber surrounding the polish rod and interposed between the upper and lower packing glands for assuring an adequate supply of lubricating fluid for the rod during reciprocation thereof. The Reeves device includes a fluid supply line and a fluid return line disposed exteriorly of the stuffing box, and in some installations their lines are subject to damage, and damage or breaking of the lines may seriously affect the efficiency of the Reeves stuffing box. The aforementioned co-pending application discloses internal passageway means for circulating or controlling the supply of fluid for the cooling chamber in order to overcome this disadvantage.

Another problem which may be encountered in connection with the polish rod is a misalignment between the pump jack and the pumping "T". This misalignment may cause undue wear on the packing members, and may squeeze the lubricant from the packing members when the pump jack is inoperative and the polish rod is suspended therefrom. The packing members may then be unduly damaged upon "start up" of the pump jack. In order to overcome this disadvantage, a swivel connection between the stuffing box and the pumping "T" has been designed as shown in co-pending application Ser. No. 483,101, filed Apr. 8, 1983 and now abandoned, and entitled "Self-Aligned Polish Rod Stuffing Box" and of which I am a co-inventor.

SUMMARY OF THE INVENTION

The present invention contemplates a novel stuffing box for polish rod and which has been particularly designed and constructed for eliminating the need for packing members such as presently required in these devices and combines the improvement with internal passageway means for the supply and/or control of fluid into a cooling reservoir around the outer periphery of the polish rod and the self-aligning swivel connection and alignment bushing means for reducing or overcoming the problem of any misalignment between the pump jack and the pumping "T". The novel stuffing box comprises a housing disposed around the outer periphery of the polish rod and having a central bore disposed concentrically around the rod in a radially outwardly spaced relation with respect thereto. A pair of spaced bushing means or upper and lower bushing means are disposed within the central bore to provide a cooling chamber therebetween, the cooling chamber surrounding the outer periphery of the rod for maintaining a supply of fluid or a fluid reservoir around the outer periphery of the rod for reducing the frictional heat, or the like, which may occur during the reciprocation of the rod. Upper and lower wiper means are carried by the upper and lower bushing means for wiping the outer periphery of the rod during reciprocation thereof to preclude accidental or unwanted entry of sand, foreign particles paraffin or other debris downhole of the stuffing box. Sealing means is provided between the uppermost bushing means and the housing for precluding leakage of fluid around the polish rod, and suitable charging seal means is provided on the lowermost bushing sleeve for closing the lower end of the cooling chamber. The charging seal means is particularly arranged for permitting the entry of fluid upwardly therearound into the cooling chamber while precluding passage of fluid downwardly therearound. In addition, internal passageway means is provided for controlled circulation of fluid from the cooling chamber and swivel connection means is provided to compensate for misalignment between the pump jack and pumping "T". A second embodiment of the invention contemplates a stuffing box incorporating the foregoing features and including an inverted sealing ring means for converting the stuffing box to use when steam is used in the well bore wherein the polish rod is in operation. The novel stuffing box is simple and efficient in operation and economical and durable in construction.

DETAILED DESCRIPTION OF THE PREFERRED EMBODIMENT

Figure 1:
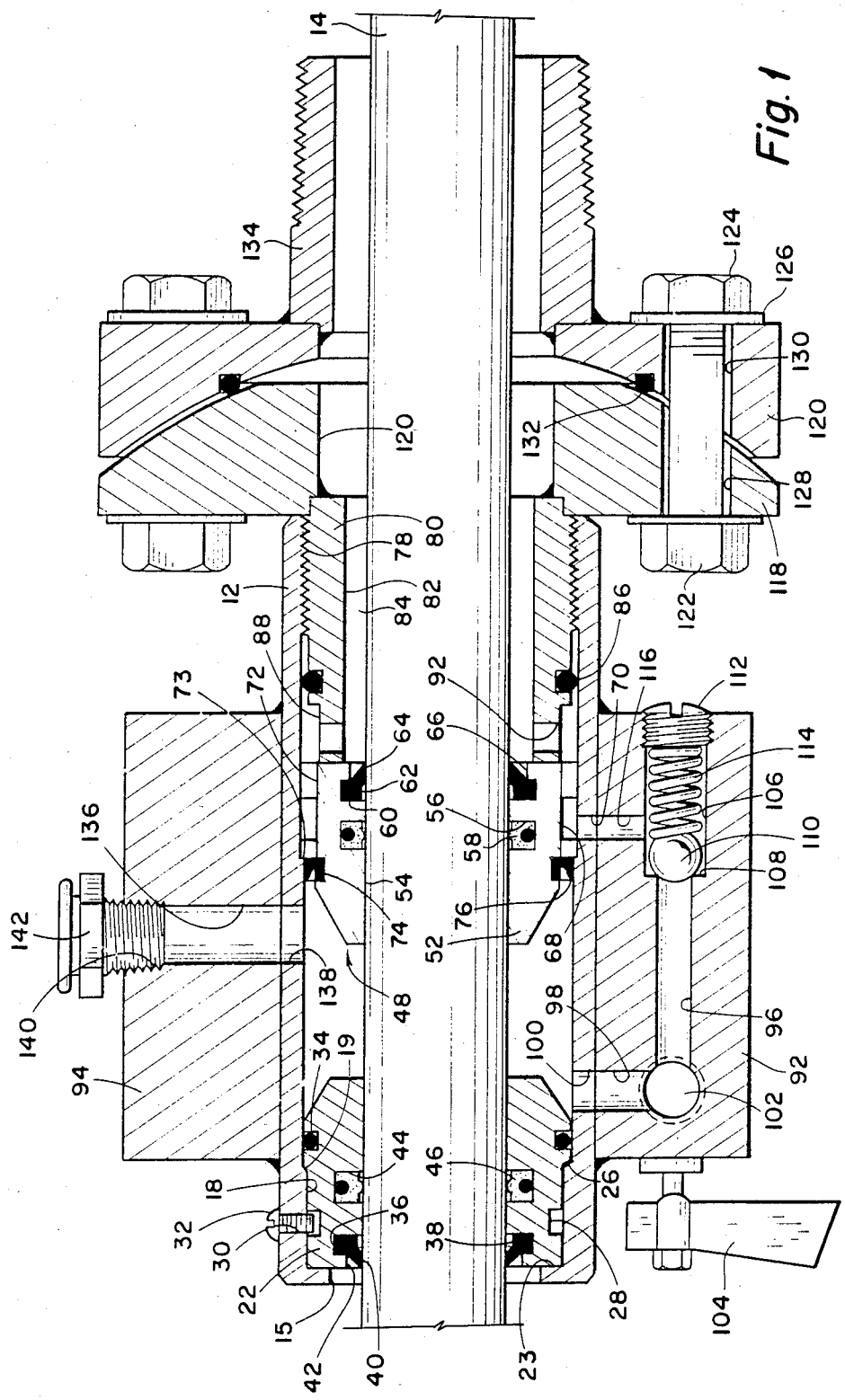
FIG. 1 is a sectional elevational view of a packless stuffing box embodying the invention.

Referring now to FIG. 1, reference character 10 generally indicates a stuffing box having a housing 12 adapted to be disposed around the outer periphery of a polish rod 14. The housing 12 is provided with a longitudinally extending central bore 16 concentrically arranged around the outer periphery of the rod 14 and spaced radially outwardly therefrom, and an aperture or bore 15 is provided at the upper end of the housing 12 for loosely receiving the rod 14 therethrough. The bore 16 is reduced at 18 to provide an annular shoulder 19 on the inner periphery thereof in the proximity of the upper end of the housing 14. A first bushing means 20 is disposed in the reduced bore portion 16 and encircles the outer periphery of the rod 14.

The bushing means 30 comprises a body 22 constructed of a suitable bushing material, such as brass or the like but not limited thereto, and having a central bore 24 extending longitudinally therethrough for sliding engagement with the outer periphery of the rod 14. The outer periphery of the body 22 is in engagement with the inner periphery of the bore 16 and reduced bore portion 18, and the upper end of the body 22 is preferably disposed against an inwardly directed annular shoulder 23 provided on the housing 12 conterminous with the bore 15. The outer periphery of the body 22 is provided with an outwardly directed circumferential shoulder 26 for engagement with the shoulder 19. An annular groove or recess 28 is provided on the outer periphery of the body 22 and disposed in substantial alignment with a bore 30 provided in the wall of the housing 12. A suitable set screw 32, or the like, may be threadedly engaged with the bore 30 for engagement with the groove 28 in order to secure the bushing means 20 in position within the housing 12. In addition, suitable sealing means, such as an O-ring 34 may be interposed between the outer periphery of the body 22 and the inner periphery of the bore 16 for precluding leakage of fluid therebetween.

A first annular recess 36 is provided in the bore 24 in the proximity of the upper end thereof for receiving a suitable yieldable or flexible annular wiper means 38 therein. The wiper means 38 includes a yieldable or flexible annular lip 40 which extends axially upwardly into or through a bore 42 provided at the uppermost end of the body 22. The bore 42 forms an annular shoulder for retaining the wiper means 38 within the recess or groove 36, and the lip member 42 constantly engages the outer periphery of the rod 14 for wiping the rod clean of any unwanted particles or foreign debris during the reciprocation of the rod. A second annular recess 44 is provided in the bore 24 in spaced relation with respect to the recess 36 for receiving a suitable annular rod seal member 46 therein. The rod seal member 46 engages the outer periphery of the polish rod 14 for precluding leakage of fluid between the body 22 and the rod 14.

A second bushing means 48 is disposed within the housing 12 and spaced below the first bushing means 20 to provide an annular cooling chamber 50 therebetween. The bushing means 48 comprises a body 52 constructed from a suitable bushing material, such as brass or the like, but not limited thereto, and is provided with a central bore 54 extending longitudinally therethrough for engagement with the outer periphery of the rod 14. An annular recess 56 is provided in the bore 54 for receiving a suitable rod seal 58 therein generally similar to the rod seal 46 for precluding leakage of fluid between the rod 14 and the body 52. A second annular recess 60 similar to the recess 36 is provided in the bore 54 in spaced relation with respect to the recess 56 and is disposed in the proximity of the lower end of the body 52. A wiper means 62 similar to the wiper means 36 is disposed in the recess 60 and is provided with a similar lip member 64 which extends axially outwardly into and/or through a bore 66 provided in the lower end of the body 52. The lip member 64 is yieldable or flexible and is in constant engagement with the outer periphery of the rod 14 for wiping thereof to preclude the entry of foreign particles into the chamber 50.

The outer periphery of the body 52 is in engagement with the inner periphery of the bore 16 and is provided with an annular recess 68 in substantial alignment with a port or bore 70 provided in the wall of the housing 12. In addition, at least one and preferably a plurality of circumferentially spaced longitudinally extending grooves or recesses 72 are provided on the outer periphery of the body 52 for establishing communication between the groove 68 and the bore 16 below the bushing means 48 for a purpose as will be hereinafter set forth. The outer periphery of the body 52 immediately above the recesses 72 engages an inwardly directed lug or shoulder 73 for precluding upward movement of the bushing 48 within the housing 12.

The outer periphery of the body 52 is further provided with an annular recess 74 for receiving an annular charging seal means 76 therein. The charging seal means 76 is of a substantially U-shaped cross sectional configuration having the outer lip thereof in engagement with the inner periphery of the bore 16 and being of a flexible nature or construction for flexing radially inwardly in response to pressure acting across the seal in order to permit flow of fluid in an upward direction thereacross but precluding flow of fluid in a downward direction with respect thereto as will be hereinafter set forth in detail. The charging seal means 76 is preferably disposed substantially immediately above the bore 70 for sealing the chamber 50 from the bore 70 under certain operating conditions of the stuffing box 10.

The lower end of the bore 16 may be threaded as shown at 78 for receiving a sleeve or follower means 80 therein. The follower 80 is provided with a central longitudinal bore 82 having a diameter greater than the outer diameter of the rod 14 to provide an annular chamber 84 therebetween open to the well bore for receiving well fluid therefrom. Suitable sealing means, such as an O-ring 86 may be interposed between the outer periphery of the follower 80 and the bore 16 for precluding leakage of fluid therebetween. The follower 80 is provided with a reduced diameter neck portion 88 above the seal means 86 to provide an annular chamber between the outer periphery of the follower 80 and the bore 16. At least one, and preferably a plurality of circumferentially spaced bores or ports 92 are provided in the housing 12 to open communication between the chambers 84 and 90.

A pair of radially outwardly extending flanges or ears 92 and 94 may be secured to the outer periphery of the housing 12 in any suitable manner, such as by welding, or the like, and are preferably diametrically opposed. One of the flanges, such as the flange 92, is provided with a longitudinally extending internal passageway 96 having the upper end thereof terminating at a substantially perpendicularly extending passageway 98. The passageway 98 is in alignment with a port or bore 100 provided in the wall of the housing 12 and open to the chamber 50 below the upper bushing means 20. Suitable valve means 102 is interposed between or disposed at the juncture between the passageways 96 and 98 for shunting the flow of fluid therein to the atmosphere when desired and as will be hereinafter set forth. The valve means 102 is preferably provided with suitable exteriorly mounted operator means 104 for facilitating manual actuation of the valve 102 as is well known.

The lower end of the passageway 96 is enlarged at 106 for providing an annular shoulder 108 which forms a valve seat for a ball means which is loosely disposed within the enlarged bore portion 106. The outer end of the bore portion 106 is open for removably receiving suitable plug means 112 therein. A suitable helical spring 114 is interposed between the plug 112 and the ball 110 for constantly urging the ball member 110 into engagement with the valve seat 108 to provide a normally closed position therefor. A transversely or perpendicularly extending bore or passageway 116 extends between the bore portion 106 and the aperture 70 in order to provide communication between the chamber 90 and the bore portion 106.

A monoconvex first swivel joint 118 generally similar to that shown in the aforementioned co-pending application Ser. No. 483,101, now abandoned, may be welded or otherwise secured to the outer or lower end of the follower 80 and is provided with a central bore 120 concentrically disposed around the outer periphery of the rod 14 and spaced radially outwardly therefrom. A monoconcave second swivel joint 102 similar to that shown in the Ser. No. 483,101 application is disposed in movable engagement with the monoconvex joint 118 and may be secured thereto in any suitable manner whereby the mating convex and concave surfaces may move with respect to one another. As shown herein, a plurality of circumferentially spaced bolts 122 extend through the joint 118 and the joint 120 for engagement with suitable nuts 124 and lock washers 126, as is well known. The aligned bores 128 and 130 extending through the joints 118 and 120 are preferably of a diameter greater than the outer diameter of the respective bolt 122 passing therethrough to permit "play" between the two elements 118 and 120 for achieving the relative movement therebetween. In addition, suitable sealing means, such as an O-ring 132 may be interposed between the mating convex and concave surfaces for precluding leakage of fluid therebetween.

An axially outwardly extending threaded stem or neck means 134 may be secured to the outer face or end of the joint 120 and is concentrically disposed around the outer periphery of the rod 14 for threaded connection with the usual pumping "T" not shown in the normal or well known manner for securing the stuffing box 10 to the pumping "T" and around the polish rod 14.

The flange or ear 94 is provided with at least one transversely extending passageway 136 which is in alignment with a bore 138 provided in the wall of the housing 12 to establish communication between the passageway 136 and the chamber 50. The outer end of the passageway 136 may be threaded as shown at 140 to receive a suitable lubrication fitting means 140 therein. In order to precharge the chamber 50 with a suitable fluid, the fitting 142 may be utilized in the normal manner for providing access to the interior of the chamber 50 in order that the fluid may be injected therein. As long as the pressure within the chamber 50 remains greater than the pressure in the well bore, the charging seal means 76 precludes the upward passage of the well fluid therearound. In addition, the force of the spring 112 acting on the ball 110 holds the ball against the valve seat 108 as long as the combined force of the spring and the well pressure is greater than the pressure in the chamber 50.

In the event the pressure in the chamber 50 falls to a point below the pressure of the well fluid, the well fluid is free to enter the chamber 50 around the charging seal means 76 as hereinbefore set forth. In the event the pressure within the chamber 50 becomes excessive, or overcomes the force of the spring 112 and the well fluid acting on the ball 110, the ball 110 will be moved away from the seat 108 for relieving the fluid pressure to the chamber 90 and thence to the well bore or into the pumping "T". The stuffing box 10 is thus self-lubricating and does not require the use of the usual packing assemblies which frequently wear and reduce the efficiency of the stuffing box. Of course, the fluid or pressure in the chamber 50 may be manually vented through the vent valve 102 if desired or necessary for any reason. Furthermore, if the chamber 50 is to be "flushed out" or cleaned, the cleaning fluid may be introduced into the chamber 50 through the passageway 136 or lubrication fitting 142 and vented from the chamber 50 by opening of the vent valve means 102.

It is to be noted that the longitudinally spaced bushing means 20 and 48 maintain a concentric relationship between the polish rod 14 and the bore 16 during reciprocation of the rod 14. In addition, the swivel joints 118 and 120 compensate for any misalignment between the pump jack (not shown) and the pumping "T" in the manner as set forth in the co-pending application Ser. No. 483,101.

Figure 2:
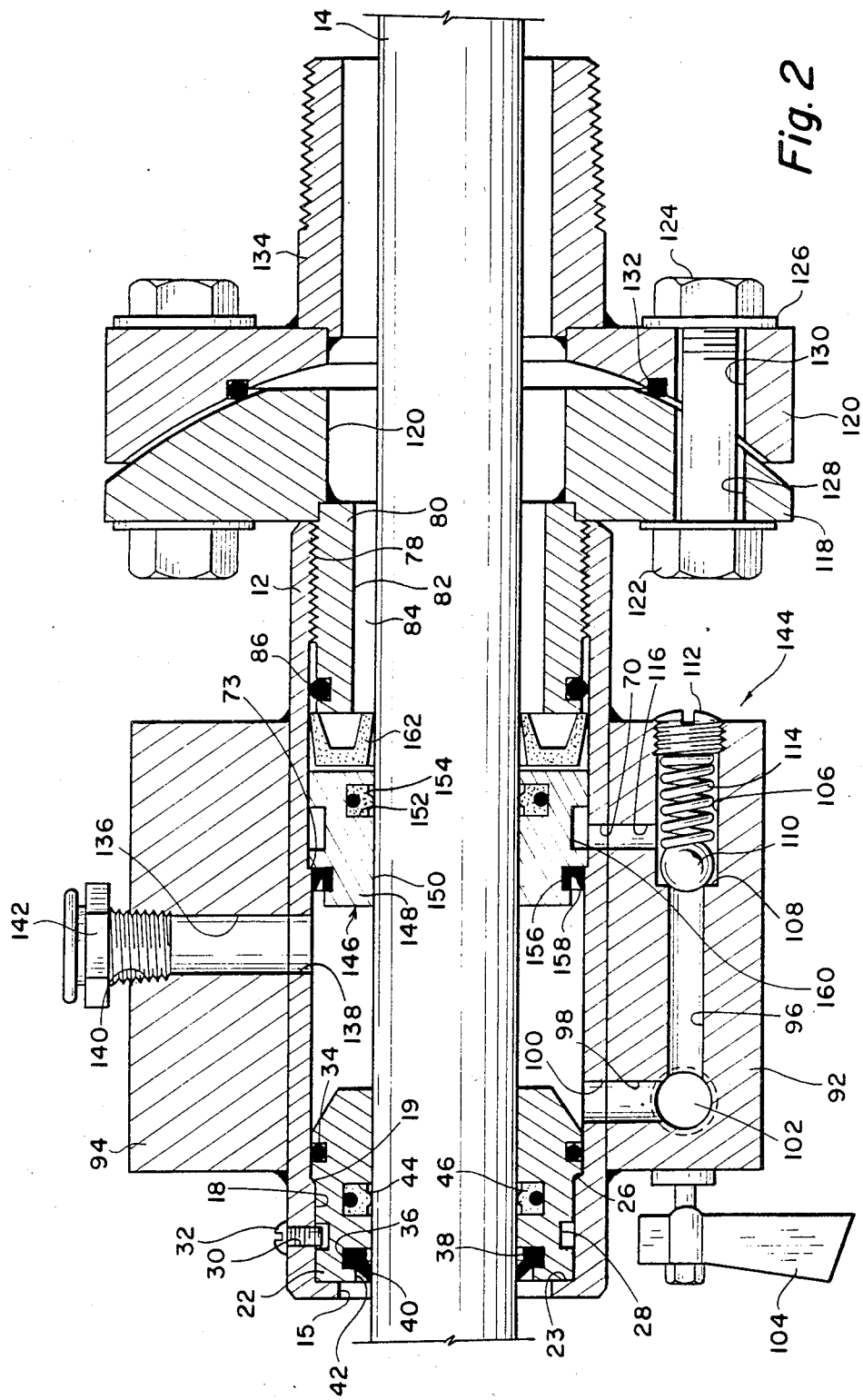
FIG. 2 is a sectional view of a modified packless stuffing box embodying the invention.

Referring now to FIG. 2, a stuffing box is indicated at 114 which is generally similar to the stuffing box 10. The stuffing box 144 includes all of the elements of the stuffing box 10 with the exception of the lower or second bushing means 48. The second bushing means of the stuffing box 144 is generally indicated at 146 and comprises a body 148 having a central bore 150 extending longitudinally therethrough and in engagement with the outer periphery of the rod 14. An annular recess 152 is provided on the bore 150 for receiving a rod seal means 154 similar to the rod seal means 46 and 58 therein. The rod seal means 154 is in engagement with the outer periphery of the polish rod 14 for precluding leakage of fluid therearound.

The outer periphery of the body 148 is provided with a first annular recess 156 in the proximity of the upper end thereof for receiving a suitable seal means 158 similar to the charging seal means 76 therein. The suitable seal means 158 closes the lower end of the cooling chamber 50 in the manner as hereinbefore set forth in connection with the charging seal means 76. A second annular recess or groove 160 is provided in the outer periphery of the body 148 and is spaced below the recess 156 and in alignment with the bore 70 of the housing 12.

An annular sealing means 162 is disposed in the bore 16 and around the outer periphery of the rod 14 below the lowermost end of the bushing means 146. The sealing means 162 is to totally isolate the chamber 50 from the well fluids and the sealing means and is preferably of a substantially inverted U-shaped cross sectional configuration. In the presence of steam in the well bore below the stuffing box 144, the well fluid is captured by the seal means 162 and is precluded from entry into the chamber 50.

From the foregoing, it will be apparent that the present invention provides a novel packless stuffing box for the reciprocal polish rod of a producing oil and/or gas well bore. The novel stuffing box includes upper and lower bushing means for assuring an efficient axial alignment between the stuffing box and the polish rod during reciprocation of the rod. Suitable annular seal means are interposed between the bushing means and the stuffing box as well as between the bushing means and the polish rod for precluding leakage of fluid therebetween without the use of the usual packing assemblies. A cooling chamber is interposed between the upper and lower bushing means and surrounds the outer periphery of the polish rod for reducing any frictional heat which may be generated during the operation of the rod. Charging seal means is provided in the lowermost bushing means for automatically charging of the cooling chamber with well fluid when desired or necessary. In addition, valved internal passageway means communicates between the well bore and the cooling chamber for controlled circulation of the well fluid to and from the cooling chamber as required during operation of the stuffing box and polish rod. Wiper means is carried by the bushing means for wiping the outer periphery of the polish rod to preclude accidental entry of debris into the interior of the stuffing box or well bore. In addition, manual circulation means is provided for flushing of the cooling chamber if desired. In addition, a swivel connection is provided between the stuffing box and the pumping "T" (Not shown) to compensate for any mis-alignment between the pump jack (not shown) and the pumping "T". Another embodiment of this invention includes fluid seal means disposed below the lowermost bushing means for isolating any fluid present in the well bore from the cooling chamber.

Whereas the present invention has been described in particular relation to the drawings attached hereto, it should be understood that other and further modifications, apart from those suggested or shown herein may be made within the spirit and scope of this invention.

What is claimed is:

1. A stuffing box for a movable rod in association with a fluid reservoir and comprising a housing disposed around the outer periphery of the rod, first bushing means disposed within the housing and having the inner periphery thereof engaged with the outer periphery of the rod and the outer periphery thereof engaged with the inner periphery of the housing, first seal means interposed between the first bushing means and the polish rod for precluding leakage of fluid therebetween, second seal means interposed between the first bushing means and the housing for precluding leakage of fluid therebetween, means cooperating between the housing and the first bushing means for retaining the first bushing means against longitudinal movement with respect to the housing, second bushing means disposed in the housing in spaced relation with respect to the first bushing means and having the inner periphery thereof in engagement with the outer periphery of the polish rod and the outer periphery thereof in engagement with the inner periphery of the housing, seal means interposed between the inner periphery of the second bushing means and the polish rod for precluding leakage of fluid therebetween, charging seal means interposed between the outer periphery of the second bushing means and the inner periphery of the housing for permitting flow of fluid therebetween in one direction and precluding flow of fluid therebetween in a reverse direction, an annular cooling chamber provided in the housing between the first and second bushing means and surrounding the outer periphery of the polish rod, valved internal passageway means providing communication between the cooling chamber as required during the operation of the polish rod, and follower means secured to the housing for precluding downward longitudinal movement of the second bushing with respect to the housing.

2. A stuffing box as set forth in claim 1 and including swivel connection means secured to the follower eans for facilitating connection of the stuffing box around the polish rod for compensation of any longitudinal misalignment during operation of the polish rod.

3. A stuffing box as set forth in claim 1 wherein the lower side of the charging seal means is in communication with the well for receiving fluid therefrom.

4. A stuffing box as set forth in claim 1 wherein the valved passageway means comprises at least one radially outwardly extending flange means secured to the outer periphery of the housing, longitudinal passageway means provided in the flange and open at one end to the interior of the housing below the charging seal means and at the opposite end of the cooling chamber, spring urged valve means interposed in the longitudinal passageway between the interior of the housing and the cooling chamber for automatic control of the circulation of the fluid to and from the cooling chamber.

5. A stuffing box as set forth in claim 4 and including vent valve means interposed between the spring urged valve means and the cooling chamber for manual venting of the fluid from the cooling chamber when required.

6. A stuffing box as set forth in claim 5 and including second radially outwardly extending flange means secured to the outer periphery of the housing and having transversely extending passageway means extending therethrough to provide communication between the exterior of the housing and the cooling chamber, means secured in the outer end of the transversely extending passageway means for providing access to the interior thereof whereby fluid may be injected into the cooling chamber.

7. A stuffing box as set forth in claim 6 wherein the fluid injected through the transversely extending passageway means and into the cooling chamber may be flushed from the cooling chamber through the vent valve means.

8. A stuffing box as set forth in claim 1 and including wiper means carried by at least one of said bushing means for constantly wiping the outer periphery of the rod during movement thereof.

9. A stuffing box as set forth in claim 1 and including wiper means carried by the first bushing means for wiping of the outer periphery of the rod during movement thereof.

10. A stuffing box as set forth in claim 1 and including wiper means carried by the second bushing means for wiping of the outer periphery of the rod during movement thereof.

11. A stuffing box as set forth in claim 1 and including wiper means carried by both the first and second bushing means for wiping of the outer periphery of the rod during movement thereof.

12. A stuffing box as set forth in claim 1 and including fluid seal means interposed between the second bushing means and the follower for isolating any fluid present in the well bore from the cooling chamber.

13. A stuffing box as set forth in claim 1 wherein the fluid seal means comprises an inverted annular sealing ring having a substantially U-shaped cross sectional configuration for engagement with the outer periphery of the rod and the inner periphery of the housing for precluding leakage of fluid therearound.

* * * * *